H. HERTZBERG.
MARINE COMPASS.
APPLICATION FILED MAY 31, 1907.
1,022,676.
Patented Apr. 9, 1912.
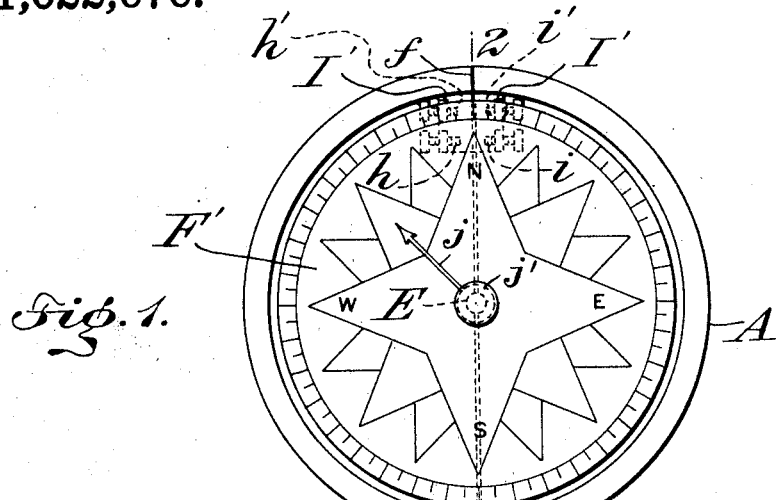
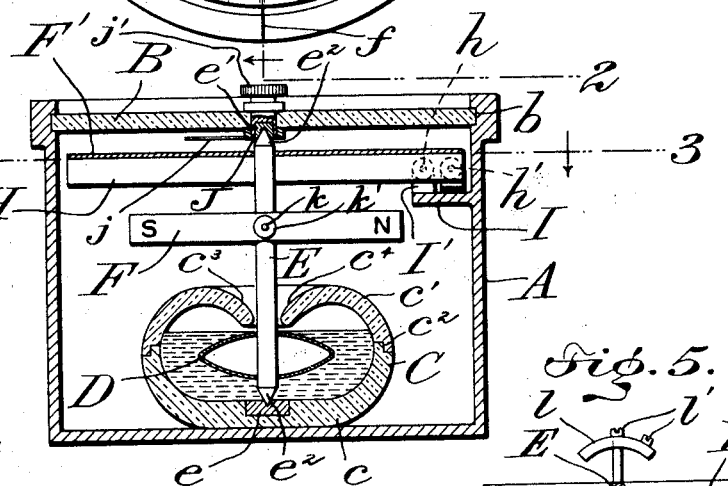
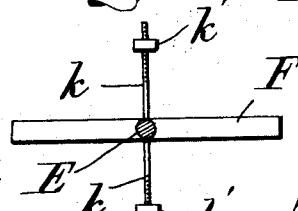
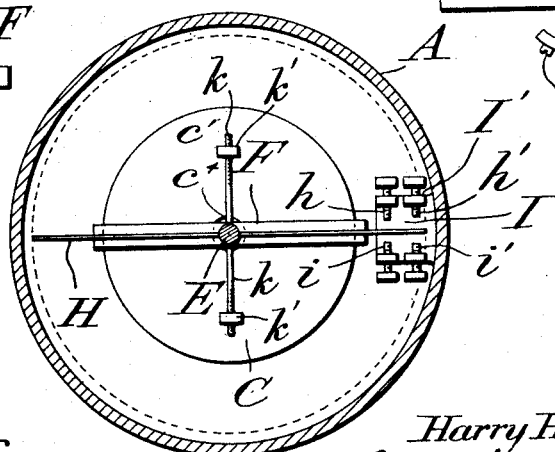
WITNESSES
O. C. Abbott
V. E. Nichols
INVENTOR
Harry Hertzberg
BY
Griffins Bernhard
ATTORNEYS

UNITED STATES PATENT OFFICE.

HARRY HERTZBERG, OF BROOKLYN, NEW YORK, ASSIGNOR TO ABBOT A. LOW, OF HORSESHOE, NEW YORK, MAURICE J. WOHL, OF NEW YORK, N. Y., AND HARRY HERTZBERG, OF BROOKLYN, NEW YORK, TRUSTEES.

MARINE COMPASS.

1,022,676.      Specification of Letters Patent.      Patented Apr. 9, 1912.

Application filed May 31, 1907. Serial No. 376,729.

*To all whom it may concern:*

Be it known that I, HARRY HERTZBERG, a citizen of the United States, residing in the city of New York, borough of Brooklyn, county of Kings, and State of New York, have invented a certain new and useful Marine Compass, of which the following is a specification.

The invention is a compass for use in connection with, or as a part of, a system for steering marine vessels, torpedoes, and any or all classes of marine craft.

The object of this invention is to support the magnetic needle of a marine compass in such manner as to sustain the weight of parts which form, or are associated with, said needle, and at the same time secure ease and freedom in the rotation of the needle, whereby the needle is rendered sensitive to the influence of the earth's north magnetic pole.

A leading feature of the compass is a hollow buoyant float connected to a needle-staff and arranged in a liquid-containing cup for the purpose of reducing the weight and friction of the needle staff in its bottom bearing of the compass box or the aforesaid cup.

Other parts of the invention will be hereinafter pointed out and claimed.

In the accompanying drawings, I have illustrated one practical embodiment of the invention, but the construction shown therein is to be understood as illustrative only, and not as defining the limits of the invention.

Figure 1 is a plan view of a compass constructed in accordance with this invention. Fig. 2 is a vertical section on the line 2—2 of Fig. 1 looking in the direction of the arrow. Fig. 3 is a horizontal section on the line 3—3 of Fig. 2 showing certain parts in plan view. Figs. 4 and 5 are views of mechanical counterpoises for the magnets.

The compass box or casing is indicated by the reference character, A, said box being composed of any suitable material, and made in appropriate form and size. The box is closed, except at the top, the latter being provided with a transparent cover, B, composed of glass and secured in the box by suitable means, such as the groove, $b$.

C designates a cup adapted to contain a liquid, in which liquid is submerged a hollow float, D. Said float is secured rigidly to a vertical staff, E, and this staff carries a magnetic needle which, in the present example of the invention, is composed of a permanent bar magnet, F, and a dial, F'. The staff, E, is provided, furthermore, with a circuit controller, H, which operates to open and close certain branches of an electrically operated circuit, the latter including devices whereby the helm of a vessel or other marine craft is moved in either direction for the purpose of steering said vessel or craft.

As shown in Fig. 2, the cup, C, is constructed to confine within itself a liquid, whereby said liquid is prevented from spilling out of the cup when the compass moves by the pitching or rolling of the vessel, and, furthermore, the liquid is confined at a point quite remote to the circuit controller and the terminals of the branches of the aforesaid helm controlling circuit, thus placing the liquid out of the path of an electric spark which is likely to result in the operations of making and breaking the circuit. Said non-spillable cup, C, is composed of a bottom section, $c$, and a top section, $c'$, and these two sections are rabbeted at their meeting edges so as to produce a lap joint, $c^2$, whereby the sections, $c$, $c'$, may be cemented one to the other, or otherwise hermetically united. The upper section, $c'$, of the cup has an inturned flange, $c^3$, which curves inwardly and downwardly to overhang the float, D, and to produce a central opening, $c^4$, in the upper side of the cup, (see Fig. 2.) The lower section, $c$, of the cup is provided with a step bearing, $e$, and the transparent cover, B, is provided with a similar bearing, $e'$, whereby the pointed ends, $e^2$, of the staff are mounted in the compass box.

The staff, E, is arranged centrally within the compass box, A, and it extends loosely through the mouth or opening, $c^4$, of the cup, C.

The float, D, is a hollow closed vessel secured in any suitable way to the staff, E. Said float may consist of a metal shell which is circular in plan view and oval in cross section, and it is essential that the float be closed hermetically, and, furthermore, that it be united to the staff so as to exclude the admission of liquid contained in the cup, C, whereby the float confines within itself a quantity of air sufficient to render said float buoyant at all times. Said float is within the cup, C, and, preferably, it is submerged in the liquid thereof, whereby the float has a tendency to lift the staff, E, for the purpose of sustaining the weight of the magnetic needle and the circuit controller, thus reducing the friction of the staff in the lower step bearing, $e$.

As shown in Fig. 2, the element, F, of the magnetic needle is a single bar magnet which is secured fixedly on the staff, E, at a point between the cup, C, and the circuit controller, H. It is not desired, however, to limit this invention to the use of a single bar magnet, for the reason that the number of said magnets may be increased as desired. The element, F', of the magnetic needle is a dial composed of metal, paper, celluloid, or any other appropriate material, said dial being secured rigidly on the staff, E, at a point below the transparent cover, B. The exposed face of this dial is provided with a chart which is inscribed with the cardinal points of the compass, the steering points and the degrees of a circle. Said dial is adapted to coöperate with index marks, $f$, which are provided on the compass box or casing and are known commonly as the "lubber lines."

The circuit controller, H, is shown as a metallic bar which is secured firmly to the staff, E, for movement therewith, and one end portion of this bar is adapted to play between two sets of contacts, $h$, $h'$, and $i$, $i'$, which contacts are included in independent branches of an electrically operated circuit. It is evident that the conductors of said electric circuit may be carried through the compass box or casing in any preferred way, and two of said conductors are connected to the contacts, $h$, $h'$, which form the terminals of one branch of said electric circuit. Two other conductors are attached to the contacts, $i$, $i'$, which form the terminals of the other branch of said electric circuit, whereby the switch element, H, is adapted to close either branch of the electric circuit by engaging with the proper pair of contacts.

The terminals, $h$, $h'$, are shown as screws which are mounted in lugs, I', of a shelf or bracket, I, the latter being secured within the compass box, A, as shown in Figs. 2 and 3, but it is evident that any other means may be employed for supporting the two sets of terminals in the path of the circuit controller, H.

When the controller, H, is shifted in one direction by the deviation of the magnetic needle, it will make contact with the terminals, $h$, $h'$, for the purpose of closing one branch of the electric circuit, but the movement of this controller in an opposite direction by the action of the magnetic needle causes said controller to make the contacts, $i$, $i'$, and thereby close the other branch of said electric circuit.

When the course of a vessel is determined upon, the steering apparatus used in connection with the compass herein described, operates automatically to guide or direct a vessel in a substantially straight course, but the action of currents and the motion of waves on the craft changes the course of the vessel in one direction or the other. This result causes the magnetic needle to dip one way or the other, whereupon the controller engages with one set of contacts, as $h$, $h'$, for closing one branch of the electric circuit, thereby operating the steering engine to restore the vessel to its course. The deflection of the magnetic needle in an opposite direction makes the controller engage with the other set of terminals, $i$, $i'$, for the purpose of closing the other branch of the aforesaid electric circuit and again operating the steering engine, whereby the helm is shifted to again restore the vessel to its course.

The deviation of the craft from a predetermined course is comparatively slight for the reason that the compass acts to operate the steering mechanism automatically and move the helm promptly, thereby correcting the course of the vessel.

The compass is "dead beat" in its operation, that is to say, it is not affected or influenced by the pitching or rolling of the vessel or craft on which said compass is used. This is due, mainly, to the frictional resistance of the liquid contained in the cup, C, to the motion of the float, D, the latter being immersed in said liquid of the cup.

I may associate with the movable staff of a dead beat compass embodying the constructions disclosed in several of my applications, means whereby the last position of the magnetic needle may be indicated; and, furthermore, I may provide a mechanical counterpoise adapted to balance the weight of the magnet or magnets on said staff.

In Fig. 2, the bearing, $e'$, for the upper end of the staff is formed by a jewel which is carried in the lower end of a screw or spindle, J, the latter being rotatably mounted in the cover, B. Said spindle carries an index or pointer, $j$, which is arranged within the compass box and over the dial, F'. The upper exposed part of the spindle is provided with a head or knob, $j'$, the latter affording a convenient means for rotating the spindle and thereby adjusting the needle. The index may be adjusted in register with the dial, and when the magnetic needle shifts, said index denotes the previous position of said needle.

Two forms of mechanical counterpoise for the needle staff are shown in Figs. 4 and 5. The form shown in Fig. 4 consists of threaded arms, $k$, $k$, attached to the staff, E, and extending at right angles to the magnet or magnets, F, said threaded arms being each equipped with a weight, $k'$, in the form of a nut which is screwed adjustably on the arm, whereby the nuts may be adjusted toward or from the staff for increasing or decreasing the efficiency of the counterpoise in counterbalancing the weight of the magnet or magnets.

As shown in Fig. 5, the counterpoise consists of the balance arcs, $l, l$, and the weights, $l'$, attached to said arcs. The arcs are made fast with the staff, E, so as to lie on opposite sides thereof, and at right angles to the magnet or magnets, F, while a proper number of weights, $l'$, are attached to the arcs so as to increase the weight thereof and counterbalance the magnet or magnets.

Having thus fully described the invention, what I claim as new, and desire to secure by Letters Patent is:

1. A compass having a box, a non-spillable liquid-cup therein, a staff stepped in said cup, a single bar magnet fixed to the staff, a dial secured to said staff, a circuit controller on the staff, and a hollow float located in the cup for sustaining the weight of the aforesaid devices on the staff.

2. In a compass, a box, circuit terminals therein, a non-spillable liquid cup also within the box and arranged at a distance from the circuit terminals, said cup being composed of hollow sections united together, a staff, a magnetic needle carried by the staff, a circuit closer mounted on the staff and coöperating with said circuit terminals, and a float in the cup and attached to the staff.

3. A mariner's compass comprising a staff, a magnetic needle thereon, a circuit controller carried by the staff, counterweights on either side of said staff, a non-spillable cup, and a float in said cup attached to the staff.

In testimony whereof I have signed my name to this specification in the presence of two subscribing witnesses.

HARRY HERTZBERG.

Witnesses:
R. C. R. BINDER,
JOSEPH F. CARDO.

---

Copies of this patent may be obtained for five cents each, by addressing the "Commissioner of Patents, Washington, D. C."